Sept. 29, 1953 R. R. BANER 2,653,803
APPARATUS FOR COOLING AND HUMIDIFYING AIR
Filed April 30, 1951 2 Sheets-Sheet 2

INVENTOR.
Rawlings R. Baner.
BY
F. E. Bradbury.
Attorney

Patented Sept. 29, 1953

2,653,803

UNITED STATES PATENT OFFICE 2,653,803

APPARATUS FOR COOLING AND HUMIDIFYING AIR

Rawlings R. Baner, Monrovia, Calif.

Application April 30, 1951, Serial No. 223,793

1 Claim. (Cl. 261—30)

An object of my invention is the production of improved means for creating and controlling a current of air in a directed path and to simultaneously reduce its temperature.

More particularly another object is the production of improved means of simple and highly effective construction, which is normally free from disorder and by which a forced draft of cool air is produced and directed for various uses.

With these and other objects in view, my invention comprises the features of construction and combination of parts hereinafter described and claimed.

Figure 1:
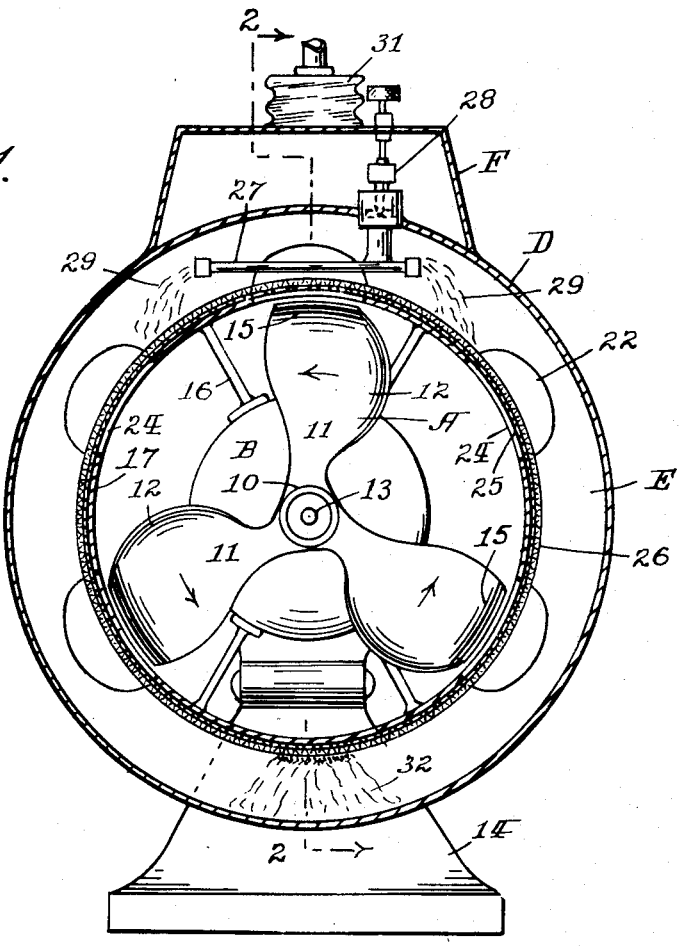
Figure 2:
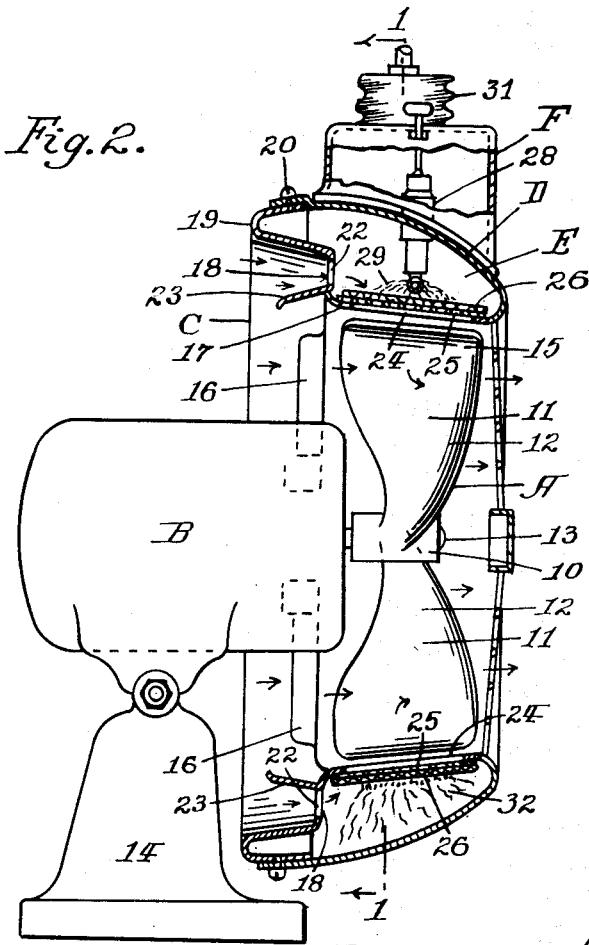
Figure 3:
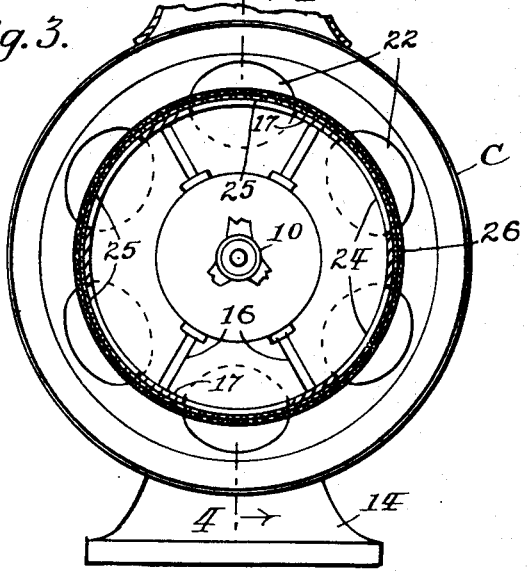
Figure 4:
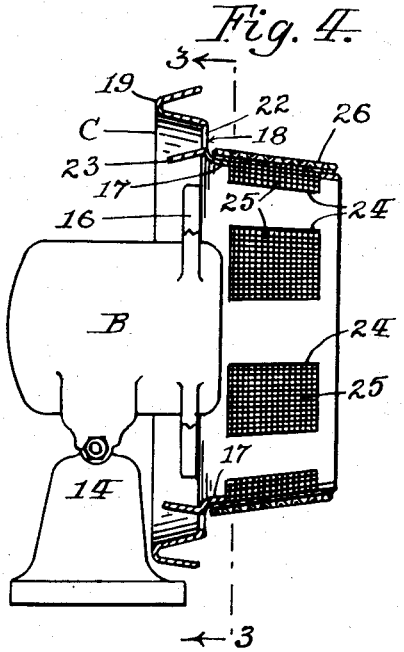

In the accompanying drawings forming part of this specification Fig. 1 is a front elevation, partly in section taken approximately on the line 1—1 of Fig. 2, of an electric motor driven fan which is equipped with my improved means by which a blast of cool air is produced, the usual front guard being omitted; Fig. 2 is a side elevation partly in vertical central section taken approximately on the line 2—2 of Fig. 1; Fig. 3 is a partial front elevation and section at reduced scale of the rearward portion of the housing, the section being taken approximately on the line 3—3 of Fig. 4, when the annular hood section is removed, and Fig. 4 is a vertical section taken approximately on the line 4—4 of Fig. 3.

In the drawings A represents a rotary fan of screw propeller type having a hub 10 and a plurality of radiating fan blades 11 suitably mounted on the hub. The portion 12 of each blade which radiates from the hub 10 is of spiral form so that when the fan is revolved forwardly by its shaft 13 a current of air is propelled longitudinally in a forward direction.

The fan is rotated and driven by a prime mover such as the electric motor B, the body of which is shown suitably supported adjacent to and adjustably by a stand 14. The blades of the fan are shaped with circumferentially concave perimeter portions 15 as hereinafter described, which when the fan is rotated in a forward direction shown by the arrows in Fig. 1, an auxiliary centripetal current of moisture laden air is directed inwardly and admixed with the first mentioned longitudinal current, whereby an ultimate blast of air of reduced temperature is propelled longitudinally by the fan as hereinafter described.

Concentrically arranged around the forward end portion of the motor body and its driven shaft 13 is an annular air conducting housing member C, which is supported in fixed concentric position by radiating struts 16. The inner portion of the housing is formed with a forwardly converging truncated conical floor 17 which substantially corresponds in length with the width of the concave peripheral end portions 15 of the fan blades. The circular floor 17 is freely spaced in close relation to the tips of the fan blades. The rearward portion of the housing member C is radially flanged to provide a circular rearward end wall 18. The outer end portion of said wall terminates rearwardly in a concentrical reversed annular supporting member 19 which is secured outwardly to the rearward end portion of housing member D by fasteners 20. The housing member D resembles an outer annular hood and is of suitable shape. The forward portion of the hood is reversed inwardly and rearwardly so as to provide the floor 17 and assist in forming a tight moistening chamber or compartment E surrounding the fan.

The inner wall 18 of housing member C is provided with a plurality of ducts 22 (Figs. 2 and 3), which admit air forwardly into the chamber E. Each duct is accompanied by a rearwardly extending louver 23 (Fig. 2), which assists in directing the flow of air into the cooling compartment.

The conical floor 17 of the air moistening chamber is provided with a plurality of circumferentially spaced air passages 24, through which air is drawn centripetally by the fan A. A grating represented by wire netting 25 is fastened over each passage 24 and a circular and conically shaped moistening band 26 of suitable water absorbent material is fitted and held closely over all of the air passages 24 (Fig. 4), including the grating, whereby the current of air which is propelled centripetally by the fan is moistened by said band.

A liquid supply tank F is mounted on the hood D from which water or other cooling liquid is fed downwardly upon the moistening band through the transverse distributing duct 27 (Fig. 1) by the hand controlled valve 28. Wicks 29 (Fig. 1) are connected to the opposite open ends of the duct 27 for distributing water evenly on the moistening band. The supply tank F is provided with a servicing opening which is normally closed by the removable screw cap 31 and the lower portion of the moistening band 26 has an absorbent wick 32 (Figs. 1 and 2), which retains surpuls liquid which may otherwise tend to collect the lower portion of the moistening chamber E.

The peripheral portions 15 of the blades of the fan are broad and concave so that a forced current of air is developed centripetally by the fan when the latter is revolved forwardly in the direction of the arrows shown in Fig. 1. Thus a forward centripetal current of cool air and a longitudinal current of unmoistened air are forcefully produced and mixed together by my improved apparatus and the resulting admixture is driven forwardly by the fan. The centripetal current of air is drawn inwardly through the band 26 thus cooling the air. The longitudinal and centripetal currents commingle and mix in a steady stream which is reduced in temperature and cool. The conical filter band 26 through which air is drawn centripetally by the fan increases the surface area of exposure and thereby increases and improves the cooling effect which is produced. I have thus found that the cooling surface exposed by the arrangement of parts provided by my improved fan and the mixing of the two currents of air as described materially improves the efficiency and effectiveness of the apparatus.

In accordance with the patent statutes, I have described the principles of operation of my invention together with the construction thereof which I now consider to represent the best embodiment thereof but I desire to have it understood that the construction shown is only illustrative and that the invention can be carried out by other means and applied to uses other than those set forth within the spirit of the invention and the scope of the following claim.

I claim:

Cooling apparatus comprising an annular chamber having front and rear walls and an inner wall substantially perpendicular to the rear wall, said inner wall defining a longitudinally disposed air delivery duct, a motor driven fan in said duct for projecting a primary stream of air forwardly therethrough, a plurality of circumferentially spaced secondary-air inlet passages in said rear wall of said chamber, a corresponding plurality of circumferentially spaced secondary-air outlet passages in the inner wall of said chamber disposed radially in said duct, means for supplying cooling fluid to the interior of said chamber, and means for contacting said cooling fluid with said secondary air, said means comprising air-permeable, cooling-fluid-wetted absorbent bands covering said secondary-air outlet passages, whereby, when said fan is driven, secondary air will be drawn through said air-inlet passages into said chamber by centripetal force, therein cooled by contact with said fluid, and the thus-cooled secondary-air centripetally drawn out of the chamber through said air-outlet passages at right angles to and directly into the path of the primary stream of air in the duct to be mixed therewith.

RAWLINGS R. BANER.

References Cited in the file of this patent

UNITED STATES PATENTS

| Number | Name | Date |
|---|---|---|
| 933,199 | Otto | Sept. 7, 1909 |
| 1,041,912 | Tyson | Oct. 22, 1912 |
| 1,129,934 | Wieldling | Mar. 2, 1915 |
| 1,524,777 | Braemer | Feb. 3, 1925 |
| 1,604,448 | Hosch | Oct. 26, 1926 |
| 1,808,183 | Spaulding | June 2, 1931 |
| 2,173,073 | Pierson | Sept. 12, 1939 |